A. GERSTNER & F. PEHAM.
EMERGENCY COUPLING.
APPLICATION FILED AUG. 9, 1915.
1,193,536.
Patented Aug. 8, 1916.
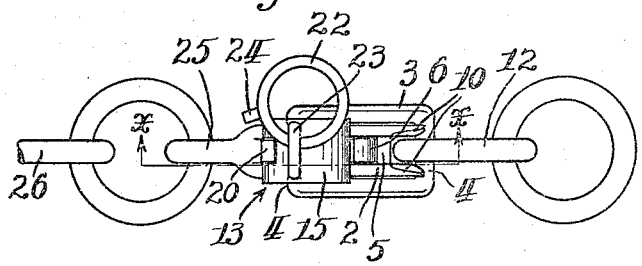
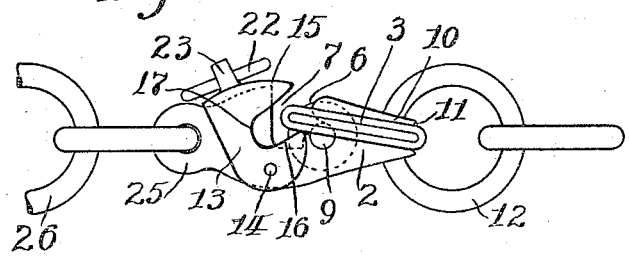
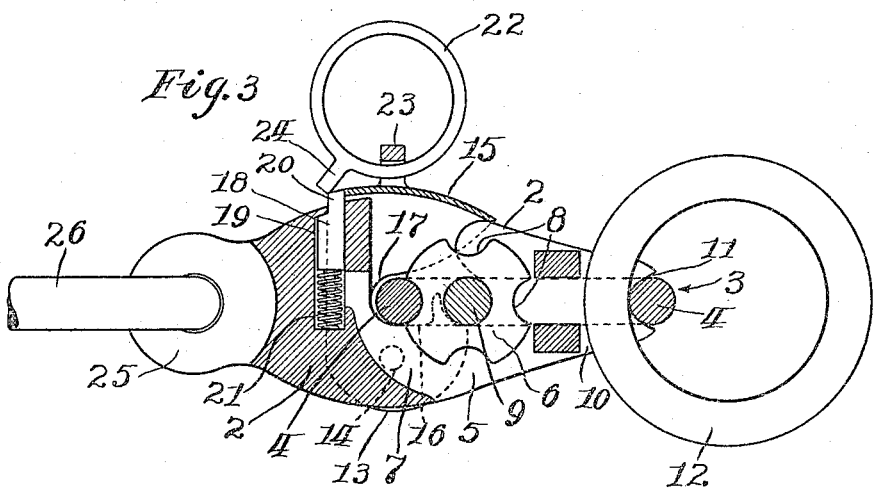
Inventors:
Anton Gerstner
Frank Peham
by: Bothrop & Johnson
Att'ys.

UNITED STATES PATENT OFFICE.

ANTON GERSTNER AND FRANK PEHAM, OF ST. PAUL, MINNESOTA.

EMERGENCY-COUPLING.

1,193,536.  Specification of Letters Patent.  Patented Aug. 8, 1916.

Application filed August 9, 1915. Serial No. 44,618.

*To all whom it may concern:*

Be it known that we, ANTON GERSTNER and FRANK PEHAM, subjects of the Emperor of Austria-Hungary, residing at St. Paul, in the county of Ramsey and State of Minnesota, have invented certain new and useful Improvements in Emergency-Couplings, of which the following is a specification.

Our invention relates to improvements in emergency couplings for chains, cables, and other like connections, and has for its object to provide an improved coupling composed of two interlocking links which cannot become separated in ordinary use but which can be easily separated by manipulation without having first to gather slack in the cable when the same is under tension.

The coupling is intended for use as part of the connection between two objects when the cable or other connection is put under tension and it may be necessary to release the same quickly in case of accident or emergency. It is particularly useful in connection with the draft chains or traces of a draft animal. If for any reason the animal should fall or become tangled up in the harness or chains so as to make it impossible or difficult to gather enough slack to unhook or unfasten the chains or traces, the use of the present separable coupling would enable the animal to be released at once without cutting the harness or breaking the chain.

In carrying out the invention we have constructed the coupling so that in ordinary use the constituent links will be held interlocked in the same plane without being cramped or jammed, no matter how great the tension, and have provided hand operated means for releasing the locking end of one of the links and lifting it out of the plane of the other link, so that the lifted link will yield to the pull upon the cable and separate from its coacting link.

More particularly the invention consists in the construction, combination, and arrangement of parts hereinafter described and claimed.

In the accompanying drawings forming part of this specification, Figure 1 is a plan view of the improved coupling connecting two links of a chain; Fig. 2 is a side view of the same showing the locking end of one of the links released and lifted by means of the lifting lever; and Fig. 3 is a longitudinal section on line *x—x* of Fig. 1.

As shown in the drawings the coupling comprises a supporting link or frame 2, and a removable link 3 having end cross bars 4. The supporting link is formed with a central longitudinally channeled opening or slot 5, within which is mounted a disk 6 rotatable upon a transverse horizontal axis. The slot 5 is open at the top and also at the rear to allow the disk to protrude above the link and also into a notch or opening 7 deeply recessed in from the top of the link and extending across the same at the rear of the slot. The disk has one or more peripheral notches 8 of a size suitable to receive one of the cross or end bars 4 of the skeleton removable link 3, as best shown in Fig. 3, where four of these notches are shown. The disk may be rotatably supported in the supporting link or frame in any convenient way, but, as here shown, it is provided with a hub 9 the projecting ends of which are journaled as trunnions in the sides of the frame or link 2.

At its forward end the link terminates in bifurcated spaced arms 10 formed with terminal notches 11 recessed in from the end and arranged in the same horizontal plane as the hub of the disk 6. These notches are adapted to receive the outer cross or end bar of the removable link, as shown in Fig. 3. The space between the bifurcated arms 10 is wide enough to allow the insertion between them of the link 12 of the draft chain which carries the coupling link 3. The disk 6 is of such size, and is positioned at such distance from the notched end of the arms 10, that when the inner cross bar of the removable link is placed within one of the notches 8 and the disk is turned back to carry this cross bar down into the same horizontal plane as the axis of the disk and the terminal notches 11 in the arms 10, the outer cross bar of the link will be drawn into the notches 11. When the removable link is thus inserted in place, as shown in Fig. 3, both of its end bars will stand in the same horizontal plane as the axis of the disk, so that a pull exerted upon the outer cross bar will be transmitted diametrically against the hub 9 through the medium of the inner cross bar, and will have no tendency to turn the disk or lift the inner cross bar. To separate the couplings the inner or locking end of the link 3 must first be lifted out of the plane of the hub 9 and the outer cross bar, so that the line of force will be angular with respect to the disk and will not pass through the axis thereof.

As a means for lifting the locking end of the removable link out of the plane of the hub 9 and notches 11 when it is desired to separate the links, as well as for locking the removable link against accidental displacement in use, we have provided a locking and lifting lever 13 which has rocking support upon the supporting link at the rear of the disk 6, and is mounted to swing upon a transverse horizontal axis. As here shown it is in the form of a U-shaped frame straddling the supporting link and extending down over the sides thereof. Near the bottom it has pivotal support upon the sides of the supporting link by means of pivot pins 14. At the top the lever has a forwardly extending hood 15 which projects part way over the disk 6 so as to cover the notch 7, while near the bottom its side members are formed with forwardly extending feet or heels 16 which project forwardly under the sides of the removable link 3 at its locking end, so that when the locking lever is tilted back upon its pivotal supports, as shown in Fig. 2, these heels will engage the underside of the locking end of the link and lift it out of the plane of the hub 9 and notches 11. Between the hood 15 and heels 16 the side members of the lever are formed with notches 17 recessed into their inner edges to receive and fit over the inner cross bar of the removable link when the links are coupled together as described, and thereby to hold the link from being lifted out of the plane of the hub 9 and notches 11, the heels 16 forming the bottoms of the notches and the hood 15 the tops thereof.

To hold the locking lever swung forward in locking position as shown in Fig. 3, we have provided a depressible plunger 18 which works in a vertical hole 19 in the supporting link at the rear of the lever 13. This plunger has an upper end 20 sufficiently reduced in size to protrude through the mouth or opening of the hole, which is restricted to confine the main body of the plunger. Beneath the plunger is a coil spring 21 which exerts upward pressure upon the plunger and holds it normally thrust up so that its reduced upper end will project up through the mouth of the hole behind the locking lever and stop it from being tilted back so as to release the rear end of the removable link.

As a convenient means for depressing the plunger to release the lever 13 and for drawing the lever back we have provided a ring 22 which is hung loosely in an eye 23 upon the top of the lever and has on its periphery a lug or key 24 by which the plunger can be thrust down far enough to enable the top of the lever to clear the same when it is tilted back into the position shown in Fig. 2.

The supporting link is provided at its rear end with an eye 25 located preferably in the same plane as the hub 9 and forward notches 11, whereby the link can be connected with the cable 26 or other draft connection. The removable link 3 is preferably rectangular in shape and wider than the supporting link so that its side members will slip over the outside of the supporting link.

When the links are in interlocking position ready for use the parts will stand in the position shown in Figs. 1 and 3 with one cross bar of the removable link lodged in the end notches 11 of the supporting link and the other cross bar in one of the peripheral notches 8 of the disk 6, and the locking lever 13 held swung forward so as to embrace and hold the locking end of the removable link within the notches 17. When the parts are in this position a pull upon the outer end of the removable link will draw the inner cross bar of the link against the disk 8 directly in line with the axis of the disk and the outer cross bar, so that it will exert no rotary effect upon the disk nor lifting effect upon the inner cross bar. So long as these cross bars remain thus in alinement with the axis of rotation of the disk there can be no separation of the two parts of the link, but as soon as the lever 13 is tilted back, as above described, and as shown in Fig. 2, its heels 16 will kick the locking end of the removable link up out of the plane of the hub 9 and notches 11, so that the line of pull will no longer pass through the axis of the disk but at one side thereof, thereby causing the idler disk to turn and carry the inner end of the removable link up clear of the supporting link so as to release it therefrom and break the cable at that point.

As the ring 22 is carried by the lever 13 and embodies in itself in the lug 24 an instrumentality for depressing the stop-plunger 18, the lever can be released and then swung back very dexterously in the same operation of the ring.

To couple the links together again, it is only necessary to insert the outer cross bar of the removable link in the notches 11 and the inner cross bar in one of the disk notches 8, and then to carry the cross bar down in the notch 7 until the link comes into alinement with the hub 9, the disk 6 turning with the link and serving to draw the outer cross bar snugly into the notches 11, and the lever 13 being tilted forward to lower the heels 16 out of the path of the link and to embrace the inner cross bar in its notches 17. When the lever is thus swung forward the plunger-stop 20 will spring up behind it and lock it from backward movement.

The coacting coupling links are here described generally as lying interlocked in the same plane, meaning thereby that the interlocking end supporting points of the links are in the same plane.

It will be seen that by reason of the rotatably mounted idler disk 6 in the notched edge of which the locking end of the removable link is seated, this end of the link will have rocking support upon the bearings of the disk, so that it can be easily lifted from the supporting link without frictional drag upon opposing surfaces, even when the draft cable is under great tension.

We claim:

1. An emergency coupling comprising two separable links, means for holding them normally interlocked in the same plane, said interlocking means comprising an idler disk journaled in the locking end of one of said links so as to turn upon a transverse axis, and a fixed element carried by the locking end of the other link and engaging said disk, and a lifting lever pivotally supported upon one of said links so as to turn upon a transverse axis and extending under the locking end of the other link whereby to lift it out of said plane.

2. An emergency coupling comprising two separable links lying normally interlocked in the same plane, a peripherally notched idler disk journaled in the locking end of one of the links so as to turn upon a transverse axis, a cross bar carried by the locking end of the other link and seating in a notch of the disk and a lifting lever pivotally supported upon the disk carrying link so as to turn upon a transverse axis and engageable with the locking end of the other link whereby to lift it out of said plane.

3. An emergency coupling comprising a supporting link having a central longitudinally slotted opening and being formed with a terminal notch in its outer end and a notch extending down from the top at the rear of said slot, a peripherally notched disk mounted in the slot so as to turn upon a transverse axis, said end and top notches lying in the same plane as the axis of the disk, a skeleton removable link fitting over said supporting link with one end lodged in said terminal notch and the other end lodged in the notch at the rear of said slot and seating in a peripheral notch of the disk, and means carried by the supporting link for lifting the locking end of the removable link out of the plane of said terminal notch and the axis of the disk.

4. An emergency coupling comprising a supporting link having a central longitudinally slotted opening and being formed with a terminal notch in its outer end and a notch extending down from the top at the rear of said slot, a peripherally notched disk mounted in the slot so as to turn upon a transverse axis and protruding into said notch at the rear of said slot, said end and top notches lying in the same plane as the axis of the disk, a skeleton removable link fitting over the supporting link with one end lodged in said terminal notch and the other lodged in the notch at the rear of the slot and seating in a peripheral notch of the disk, and a lifting lever pivotally supported upon the supporting link at the rear of said disk and having heels extending under the locking end of the removable link in position, when the lever is tilted, to engage and lift the locking end of the removable link out of the plane of said terminal notch and the axis of the disk, whereby to release the removable link.

5. An emergency coupling comprising a supporting link having a central longitudinally slotted opening and being formed with a terminal notch in its outer end and a notch extending down from the top at the rear of said slot, a peripherally notched disk mounted in the slot so as to turn upon a transverse axis, said end and top notches and the axis of the disk lying in the same plane, a removable link supported upon said supporting link and having at one end a cross bar lodged in said terminal notch and at the other end a cross bar lodged in the notch at the rear of said slot and seating in a peripheral notch of the disk, a lifting lever pivotally supported upon the supporting link at the rear of said disk and having heels engageable with the underside of the locking end of the removable link, whereby to lift it out of the plane of the terminal notches and the axis of the disk, and a spring controlled stop at the rear of the lever whereby to hold it normally tilted forward with said heels in downturned position.

6. An emergency coupling comprising a supporting link having a central longitudinally slotted opening and being formed with a terminal notch in its outer end and a notch extending down from the top at the rear of said slot, a disk mounted in the slot so as to turn on a transverse axis, the axis of the disk lying in the same plane as said end and top notches, a skeleton removable link fitting over said supporting link with one end lodged in said terminal notch and the other end lodged in said top notch and seating in the periphery of said disk, a lifting lever pivotally supported upon the supporting link at the rear of said disk and having heels protruding under the locking end of the removable link, whereby to lift the same out of the plane of said end and top notches, a spring pressed plunger carried by the supporting link at the rear of said lever and forming a stop to prevent the lever from being tilted back, and a ring hung loosely on the top of said lever and provided with a lug in position to be pressed down upon said plunger whereby to release said lever.

In testimony whereof we affix our signatures in presence of two witnesses.

ANTON GERSTNER.
FRANK PEHAM.

Witnesses:
ARTHUR P. LOTHROP,
H. SWANSON.

Copies of this patent may be obtained for five cents each, by addressing the "Commissioner of Patents. Washington, D. C."